United States Patent
Bushue et al.

(10) Patent No.: US 8,543,848 B2
(45) Date of Patent: Sep. 24, 2013

(54) REDUCING LATENCY WHEN ACTIVATING A POWER SUPPLY UNIT

(75) Inventors: Michael Bushue, Santa Clara, CA (US); Drew G. Doblar, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 368 days.

(21) Appl. No.: 12/886,711

(22) Filed: Sep. 21, 2010

(65) Prior Publication Data

US 2012/0072738 A1 Mar. 22, 2012

(51) Int. Cl.
*G06F 1/26* (2006.01)
*G06F 1/32* (2006.01)

(52) U.S. Cl.
USPC .......... 713/300; 713/320; 713/321; 713/323; 713/324; 713/400

(58) Field of Classification Search
USPC .................. 713/300, 320–321, 323–324, 340
See application file for complete search history.

(56) References Cited

U.S. PATENT DOCUMENTS

| | | | |
|---|---|---|---|
| 2008/0204274 A1* | 8/2008 | Peters | 340/870.07 |
| 2009/0239708 A1* | 9/2009 | Lin et al. | 482/7 |
| 2010/0052426 A1* | 3/2010 | Carter et al. | 307/64 |
| 2011/0248646 A1* | 10/2011 | Beyer et al. | 315/294 |
| 2012/0068544 A1* | 3/2012 | Bushue et al. | 307/80 |
| 2012/0072738 A1* | 3/2012 | Bushue et al. | 713/300 |
| 2012/0072754 A1* | 3/2012 | Doblar et al. | 713/340 |

* cited by examiner

*Primary Examiner* — Tanh Nguyen
(74) *Attorney, Agent, or Firm* — Osha Liang LLP

(57) ABSTRACT

A method for reducing latency using a charging module when activating a power supply unit (PSU) among a plurality of PSUs in a power supply system. The method includes: Receiving, by the PSU from a power input feed, input power; receiving, from a supply bus shared by the plurality of PSUs, a first controlled signal designating a status of the PSU as standby; disabling, in response to the first controlled signal, a switching regulator of the PSU; receiving, from a voltage rail of the supply bus, charge flowing through a resistor of the charging module to maintain a charge of an output capacitor of the switching regulator; receiving a second controlled signal designating the status of the PSU as active; enabling the switching regulator; outputting a voltage from the PSU through the charging module to the voltage rail; and charging the output capacitor using the PSU.

20 Claims, 6 Drawing Sheets

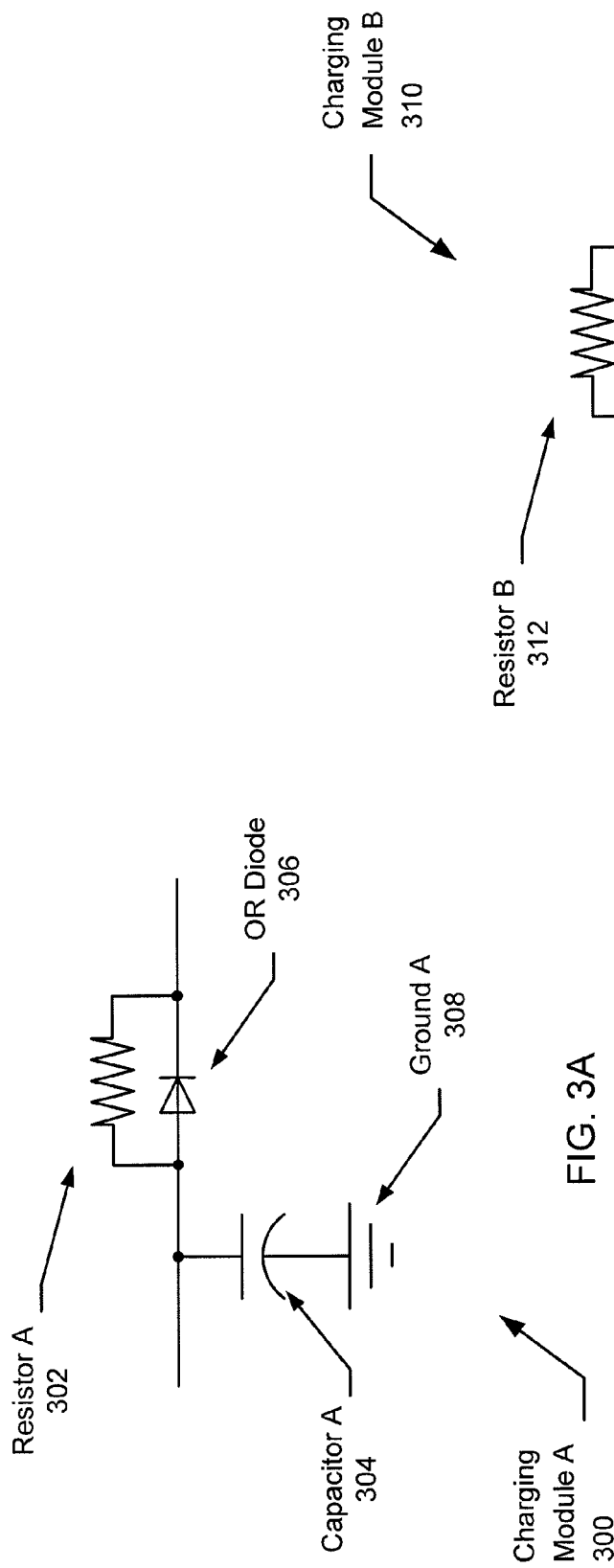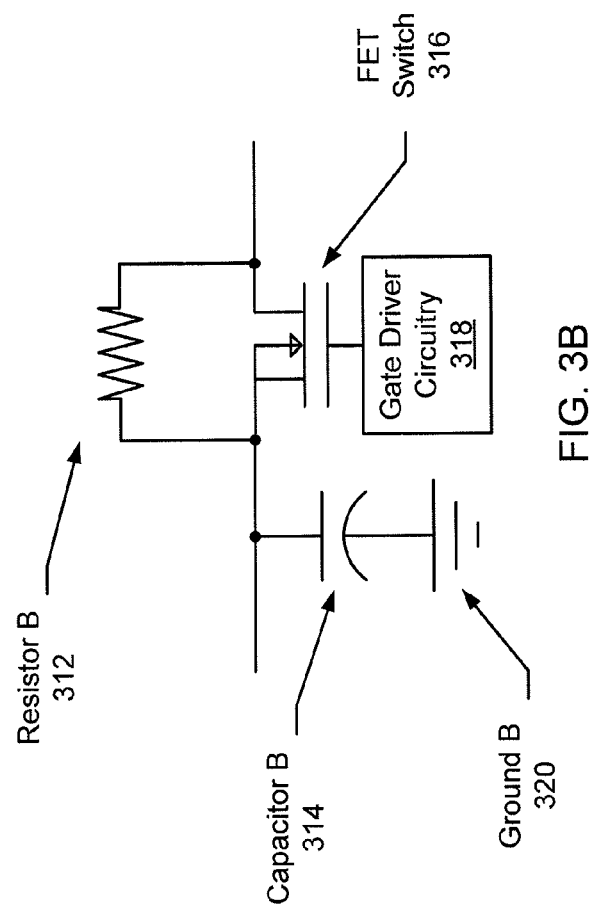

REDUCING LATENCY WHEN ACTIVATING A POWER SUPPLY UNIT

BACKGROUND

Some computer systems require a reliable supply of electrical power. For example, a server used to process sales and accounting transactions may be considered to be a critical to a corporation, and may thus require a continuous supply of electrical power. In such computer systems, electrical power may be provided by multiple power supply units (PSUs). In particular, one (or more) of the PSUs may be held in reserve, to be brought on line in the case of a failure of an active PSU.

Weighing against the performance required of a power supply system is a need to reduce energy consumption. PSUs in a power supply system, if not managed properly, may consume high amounts of energy. Government standards have been enacted to encourage a reduction in the use of power supply systems, both in an effort to conserve resources and to help reduce the energy costs of companies using power supply systems. Further, companies that design power supply systems and their components, including control systems, may be motivated to exceed the government standards that have been created.

SUMMARY

In general, in one aspect, the invention relates to a method for reducing latency using a charging module when activating a power supply unit (PSU) among a plurality of PSUs in a power supply system. The method includes receiving, by the PSU from a power input feed, input power, and receiving, from a supply bus shared by the plurality of PSUs, a first controlled signal designating a status of the PSU as standby. The method further includes disabling, in response to the first controlled signal, a switching regulator of the PSU, and receiving, from a voltage rail of the supply bus, charge flowing through a resistor of the charging module to maintain a charge of an output capacitor of the switching regulator. The method further includes receiving, from the supply bus, a second controlled signal designating the status of the PSU as active, and enabling, in response to the second controlled signal, the switching regulator. In response to enabling the switching regulator, the method includes outputting a voltage from the PSU through the charging module to the voltage rail, and charging the output capacitor using the PSU.

In general, in one aspect, the invention relates to a system for reducing latency when activating a power supply unit (PSU) among a number of PSUs in a power supply system. The system includes a supply bus, a number of power input feeds, and the number of PSUs. The supply bus includes a voltage rail, where the supply bus and voltage rail are operatively connected to each PSU within the power supply system. Each power input feed provides input voltage to one of the plurality of PSUs. Each PSU includes memory for storing instructions executed by a central processing unit (CPU), a charging module that includes a resistor and a switch, and a switching regulator that includes an output capacitor. Each PSU is configured to receive input power from one of the power input feeds, and receive, from the supply bus, a first controlled signal designating the status of the PSU as standby. Each PSU is further configured to disable, using the CPU and in response to the first controlled signal, the switching regulator, and receive, from the voltage rail, charge flowing through the resistor of the charging module to maintain a charge of the output capacitor of the switching regulator. Each PSU is further configured to receive, from the supply bus, a second controlled signal designating the status of the PSU as active, and enable, using the CPU and in response to the second controlled signal, the switching regulator. Each PSU is further configured to charge the output capacitor using the PSU, and output voltage from the PSU through the charging module to the voltage rail.

In general, in one aspect, the invention relates to a power supply unit (PSU). The PSU includes a charging module, a switching regulator, and an input stage. The charging module includes a resistor and a switch and is operatively connected to a supply bus. The switching regulator includes an output capacitor and is operatively connected to the charging module. The input stage includes a number of components configured to receive input power from a power input feed, and receive, from the supply bus through the resistor of the charging module, a first controlled signal designating a status of the PSU as standby. The input stage is further configured to disable, in response to the first controlled signal, the switching regulator, and receive, from a voltage rail of the supply bus, charge flowing through the resistor of the charging module to maintain a charge of the output capacitor. The input stage is further configured to receive, from the supply bus, a second controlled signal designating the status of the PSU as active, and enable, in response to the second controlled signal, the switching regulator. In response to enabling the switching regulator, the input stage is further configured to output a voltage from the input stage through the switch of the charging module to the voltage rail, and charge the output capacitor using the voltage output from the input stage.

Other aspects of the invention will be apparent from the following description and the appended claims.

BRIEF DESCRIPTION OF DRAWINGS

FIGS. 3A and 3B each show a single line diagram of a charging module in accordance with one or more embodiments of the invention.

DETAILED DESCRIPTION

Figure 1:
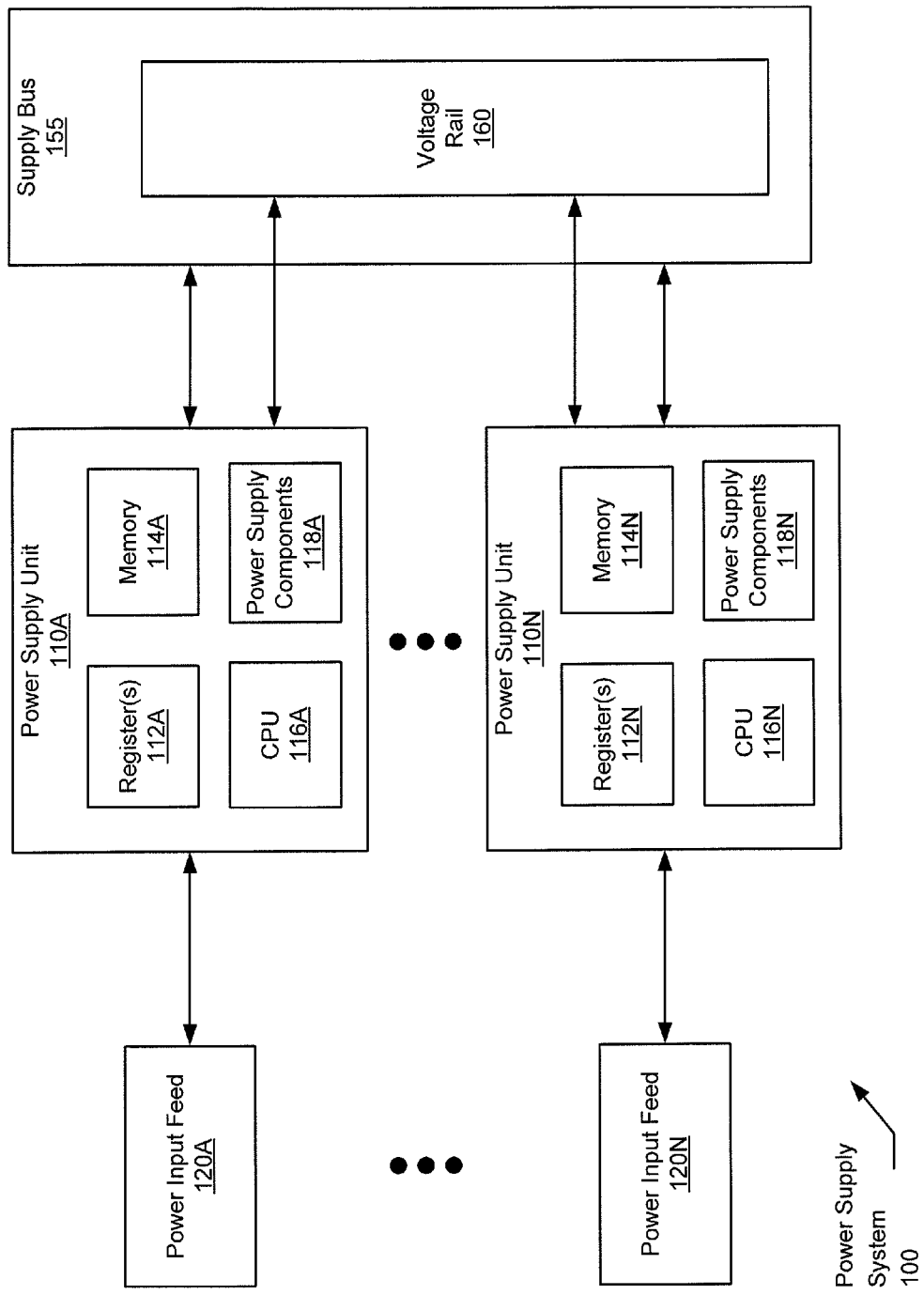
FIG. 1 shows a diagram of a PSU system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for reducing latency when activating a PSU. More specifically, one or more embodiments of the invention provide a method and system for reducing the time required to change the status of a PSU in a PSU network from standby to active. Initiating and/or changing the status of the PSU from standby to active may involve the use of a controlled signal, which is sent to the PSU from a controller, the other PSUs in the power supply system, or from some other suitable source. A controlled signal may be called by a number of other names, depending, for example, on the control system used. Examples of other names for a controlled signal include, but are not limited to, a control signal, a current share signal, a controller signal, and an activation signal.

FIG. 1 shows a diagram of a power supply system (100) in accordance with one or more embodiments of the invention. The power supply system (100) includes multiple power input feeds (e.g., (120A), (120N)), multiple PSUs (e.g., (110A), (110N)), and a supply bus (155). Each PSU includes one or more registers (e.g., (112A), (112N)), memory (e.g., (114A), (114N)), a central processing unit (CPU) (e.g., (116A), (116N)), and power supply components (e.g., (118A), (118N)). The supply bus (155) includes a voltage rail (160). Each of these components is described below. One of ordinary skill in the art will appreciate that embodiments of the invention are not limited to the configuration shown in FIG. 1.

In one or more embodiments of the invention, the power input feed (e.g., (120A), (120N)) is configured to provide power to the PSU. The power provided by a power input feed may be alternating current (AC) or direct current (DC). A power input feed may have more than one connection to a PSU. For example, a phase-to ground to connection may have two connections to the PSU, while a three-phase-to-ground connection may have four connections to the PSU. In one or more embodiments of the invention, the power provided by the power input feed is designed and sized to provide a particular level and type of power to the PSU to which the power input feed is connected. One or more power input feeds may be connected to a different source of power than the remaining power input feeds in the power supply system.

In one or more embodiments of the invention, the power supply system (100) provides electrical power to a single computing device (e.g., a server, mainframe, desktop PC, laptop, PDA) or to a collection of computing devices (e.g., a blade server, a server rack, a computing cluster). The power supply system (100) may include any number of power supply units (PSUs). Typical power supply system architecture uses an even number of PSUs. Those skilled in the art will appreciate that a number of different power supply system architectures exist. Such architectures may provide redundancy of power input feeds and/or PSUs.

In one or more embodiments of the invention, each PSU is configured to receive input power from a power input feed and send power to the voltage rail (160). In one or more embodiments, a PSU converts alternating current (AC) to direct current (DC). A PSU may also convert AC to DC. Further, a PSU may change (e.g., reduce, increase) a first DC voltage to a second DC voltage. In one or more embodiments, the PSU may change a first AC voltage to a second AC voltage.

In one or more embodiments, each register (e.g., (112A), (112N)) may be an electronic memory location configured to store configuration settings for the PSU (e.g., (110A), (110N)). The configuration settings may be part of a control system and received from a controller (not shown), a number of PSUs in a power supply system, or any other suitable source. The following list includes examples of registers that may be included in the PSU, according to one or more embodiments:

ISSEL—IStar indicator, indicates that the PSU is configured to participate in IStar system mode.
ISHARE—indicates the level of the controlled signal, common to all power supplies.
ISON—indicates the level of the ACTIVE ON threshold.
ISOFF—indicates the level of the ACTIVE STANDBY OFF threshold.
ISDRIP—IStar drip indicator, indicates that the ACTIVE STANDBY OFF threshold is to be incremented.
ISFAULT—IStar fault indicator, indicates a fault in a power supply.
ISREENABLED—Indicates that IStar system mode may be reentered.
ISOFFONLOTS—Indicates excessive transitions from ACTIVE STANDBY OFF to ACTIVE ON states within a time window. This signal is latched within the PSU until cleared by the system.
EXCESSIVE_ISFAULT—Indicates excessive ISFAULT events. This signal is latched within the PSU until cleared by the system.
IS_STATE_FORCE—Indicates that the IStar state is forced by system controller.
IS_STATE—Indicates IStar system mode.
IS_ASOFF_COUNT_LIMIT—Indicates the IStar ACTIVE STANDBY OFF count limit (number of entries into ACTIVE STANDBY OFF that triggers a required reduction of ISOFF.
IS_ASOFF_COUNT_INTERVAL—Indicates the interval over which entries into IStar ACTIVE STANDBY OFF are counted.
IS_STEPUP_SIZE—Indicates Istar threshold step up size number of LSBs by which ISOFF is incremented by each handling of ISDRIP.
IS_STEPDOWN_SIZE—Indicates the IStar threshold step down size.
IS_DRIP_INTERVAL—Indicates the IStar interval of time after which the ACTIVE STANDBY OFF threshold is incremented by the IS_STEPUP_SIZE.
IS_FAULT_FORCE—Indicates an IStar fault force.
IS_FAULT_ENABLE—Indicates an IStar fault enable.
IS_FAULT_ON_TIME—Indicates the minimum time for which the PSU remains ON after ISFAULT becomes active. After this time, the PSU enters ON state with IStar disabled.
IS_PSU_NAME—Indicates an ID for the PSU.
IS_FAULT_COUNT_LIMIT—Indicates an IStar fault count limit.
IS_FAULT_COUNT_INTERVAL—Indicates an IStar fault count limit interval.

In one or more embodiments of the invention, the CPU (e.g., (116A), (116N)) is a central processing unit. The CPU may be a single-core processing chip, a multi-core processing chip, or a multi-chip module including multiple multi-core processing chips. Those skilled in the art will appreciate that the CPU may be known by other names, including but not limited to an integrated circuit, a processor, a microprocessor, and a multi-core processor. In one or more embodiments of the invention, the memory (e.g., (114A), (114N)) may include one or more cache memories, main memory, and/or any other suitable type of memory (e.g., random access memory (RAM), cache memory, flash memory). The memory (or portions thereof) may also be part of the CPU.

The power supply components (e.g., (118A), (118N)) are described below with respect to the example single line diagram shown with respect to FIG. 2.

In one or more embodiments of the invention, the supply bus (155) is configured to share voltages, input/output signals, fault detection signals, and other appropriate signals between PSUs in the power supply system (100). The supply bus may include a number of parallel and/or serial control buses or channels. The supply bus may be configured to facilitate more than one channel of communication, voltage, and/or current. For example, the supply bus may include the voltage rail (160). In one or more embodiments of the invention, the voltage rail (160) of the supply bus (155) is configured to send and receive operating voltages and/or currents. For example, the voltage rail may be used to receive 12V outputs (i.e., normal operating voltage for a PSU that is on) from one or more PSUs within a power supply system. Some or all of the supply bus (155) may be implemented on any medium for data communication (e.g., wire cable, fiber-optic cable, wireless connection). Further, the supply bus (or portions thereof) may be implemented using any network standard (e.g., Inter-Integrated Circuit Bus, SMBus, PMBus, Ethernet, Token Ring, WiFi, Bluetooth, ZigBee).

One or more embodiments of the invention are designed to operate in conjunction with a control system sending and receiving instructions using a controller (not shown). A controller may be used to manage, to some degree, the operation of each PSU in a power supply system. A controller may communicate by sending and/or receiving one or more controlled signals. The controller may be powered by a dedicated power input feed or by a power input feed shared by a PSU or some other device in the power supply system. The controller may also be connected to an uninterruptible power supply (not shown) for continuous operation.

A term used in one or more embodiments of the invention is current share, which refers to a sharing of input and output signals, which may be referred to as controlled signals. In one or more embodiments of the invention, a control system of a power supply system uses current share between PSUs on a supply bus in a power supply system. In other words, the supply bus may be configured to send a controlled signal (in the form of voltage or current) to each of the PSUs connected to the supply bus. The supply bus may also receive a controlled signal from a PSU, where the controlled signal may be sent to a controller and/or to other PSUs in the power supply system. Such a bidirectional controlled signal may, for example, indicate the output power of each PSU in the power supply system as a percentage of the maximum output power or the actual output power for each PSU.

In one or more embodiments of the invention, a controlled signal may be an average (e.g., mean, median) of the output (or percentage of the output) of all PSUs in the power supply system. In one or more embodiments of the invention, the controlled signal is an average of the output of all enabled PSUs (i.e., PSUs operating in the IStar mode of Active ON) in the power supply system. The output may be the actual output power of the PSU, the maximum output power of the PSU, or some other measure of output of the PSU. In such a case, it is possible that the controlled signal may decrease slightly after a PSU in the power supply system changes its IStar mode from Active standby OFF to Active ON (described below). The controlled signal may also be a summation of the output (or percentage of the output) of all PSUs in the power supply system. Those skilled in the art will appreciate that the controlled signal may be configured in various other ways to communicate with the PSUs in the power supply system.

In one or more embodiments of the invention, a controlled signal sent through the supply bus to each of the PSUs connected to the supply bus is used in conjunction with a controller to manage each of the PSUs in the power supply system. For example, a controlled signal may instruct a PSU to turn on, to turn off, to go into an active standby off mode, to go into an active standby on mode, to modify settings, or to perform some other instruction. A controlled signal may also supply thresholds and modes to a PSU such that the PSU may operate autonomously. Two examples of a control system where a controlled signal is sent to one or more PSUs in a power supply system are the IStar control system and the Light Load Efficiency Mode (LLEM) control system. In one or more embodiments of the invention, the LLEM control system is used to detect a fault in the power supply system. LLEM may also be part of the IStar control system or some other control system.

In one or more embodiments of the invention, IStar is a power supply design and method of control of a power supply system to manage the PSUs in a manner that increases energy efficiency. The IStar control system operates differently than many conventional control systems. For one, the IStar control system is delegated to each PSU in a power supply system. This allows for each PSU, once it receives initial thresholds and settings from the controller, to provide autonomous control for normal operation without intervention from a central control source. In other words, the PSU can operate in IStar without any further monitoring or instruction from a controller. In one or more embodiments, a controller may configure settings of one or more PSUs in a power supply system to activate/deactivate at specific system load levels. The controller may set and/or modify modes, thresholds, default values, and other operating conditions of a PSU.

IStar features at least two different modes: Active standby OFF and Active ON. In one or more embodiments of the invention, IStar features a more energy efficient standby mode for a PSU. The standby mode in IStar is Active standby OFF. In the IStar mode of Active standby OFF, unnecessary functions of the PSU are quiesced so that only internal monitoring and control functions (i.e., functions that have low power usage) are active. Further, the input power factor correction (using the PFC module, described below with respect to FIG. 1B) is peak charged. In other words, the power factor is at or near unity, and so the most, if not all, available power for the PSU may be utilized for the monitoring and control functions required during Active standby OFF mode. The IStar mode of Active ON is similar to the characteristics of a PSU mode of ON outside of IStar control.

In one or more embodiments of the invention, under IStar control, the PSUs in a power supply system initially receive IStar modes and thresholds from a controlled signal sent by the controller. The IStar modes and thresholds may be unique to each PSU in the power supply system. In one or more embodiments, the controlled signal sent by the controller under IStar dictates an order under which each PSU in the power supply system is instructed to activate (i.e., change IStar mode to Active ON). The order dictated by the controlled signal may be implied by the threshold for Active ON assigned to each PSU. For example, a PSU that is designed to change its mode to Active ON first among the current share PSUs in the power supply system may receive a threshold of 0.1V for Active ON. Further, a PSU that is designed to change its mode to Active ON second among the current share PSUs in the power supply system may receive a threshold of 0.2V for Active ON.

In one or more embodiments of the invention, the threshold for the IStar mode of Active standby OFF includes a default value, a range of potential threshold values, and an initial threshold value. While the threshold values herein are described as voltages, the threshold values may be other types of values, including but not limited to current (measured in Amperes). The default value may represent a maximum value allowed for the IStar mode of Active standby OFF.

Further, in one or more embodiments of the invention, the threshold for the IStar mode of Active ON includes a default value, a range of potential threshold values, and an initial threshold value. While the threshold values for the IStar mode of Active ON may be of the same type (e.g., voltage in volts, current in amperes) as the threshold values for the IStar mode of Active standby OFF. The default value may represent a minimum value allowed for the IStar mode of Active ON.

In one or more embodiments of the invention, for a particular controlled signal sent to a PSU by the controller, any and all threshold values associated with the IStar mode of Active standby OFF are less than any and all threshold values associated with the IStar mode of Active ON. In other words, there may be a gap between the highest possible threshold value for the IStar mode of Active standby OFF and the lowest possible threshold value for the IStar mode of Active ON.

In one or more embodiments of the invention, the rationale for having the gap between the highest possible threshold value for the IStar mode of Active standby OFF and the lowest possible threshold value for the IStar mode of Active ON is because the current share (i.e., controlled) signal delivered to each PSU has an error tolerance that may range from +/−5% to +/−15%. Further, a power supply operating at low load (e.g., 20% of its maximum load) may have an error tolerance that ranges from +/−1% to +/−3%. As a result, to avoid enabling an incorrect IStar mode based on a controlled signal received by a PSU, the threshold value for the IStar mode of Active standby OFF may be set at least 4% (in terms of the total output capability for a PSU) lower than the threshold value for the IStar mode of Active ON. Further, the gap between the thresholds for the IStar modes of Active ON and Active standby OFF helps to provide hysteresis in the on/off function. In other words, a PSU avoids unnecessary and frequent switching between the IStar modes of Active ON and Active standby OFF that would otherwise by caused by the time-varying load.

In one or more embodiments of the invention, a separate activation signal is needed to activate IStar in each PSU. The activation signal may be sent by the controller, by one or more of the current share PSUs in the power supply system, or any other suitable device. The activation signal may also be part of the controlled signal sent by the controller.

In one or more embodiments of the invention, after receiving an activation signal, each PSU is designed to operate autonomously while under IStar control using the controlled signal. The controlled signal may be continuous or discrete. A discrete controlled signal may be sent on regular intervals or on a random basis. In one or more embodiments of the invention, the controlled signal is an aggregation of all signals emitted by each PSU in the power supply system. The level of each controlled signal received by a PSU is checked against its current thresholds to determine whether a different mode (whether under IStar control or not) should be enabled. Controlled signals may be serialized on serial buses (e.g., supply bus), sent in parallel over parallel buses, or any suitable combination thereof.

In one or more embodiments of the invention, the thresholds of an IStar mode may be adjusted under certain conditions. The conditions may be programmed into the PSU, set by the controller as part of the activation signal, using some other signal or device, or any suitable combination thereof. In one or more embodiments of the invention, a goal of a PSU operating under IStar is to set the threshold value for the IStar mode of Active standby OFF as high as possible. The rationale for such a goal may be to utilize the significant energy efficiency and associated energy savings that the IStar mode of Active standby OFF generates compared to other standby modes outside of IStar. After receiving the activation signal, a PSU under IStar control may be configured to make adjustments to a threshold for any IStar mode without further instruction from or intervention by the controller.

In one or more embodiments of the invention, each PSU under IStar control also has the ability to perform other dynamic functions, including but not limited to fault detection or other absence of a PSU in the power supply system, creating new an order of activation within the power supply system, and establishing new thresholds for each IStar mode. Further, PSUs operating under IStar may utilize signals from, or otherwise operate in conjunction with, other control systems. For example, a signal designating a fault in the power supply system may be supplied to the IStar control system by a different control system, such as LLEM. Alternatively, LLEM (or an equivalent signal) may be integrated with IStar and used to monitor fault conditions in the power supply system. When LLEM sends a fault signal in response to detecting a fault, each PSU may respond to the fault signal from the LLEM while operating in IStar mode.

In one or more embodiments of the invention, the controller is configured to reconfigure the power supply system by sending a subsequent controlled signal that supersedes the previous controlled signal sent to the PSUs in the power supply system. The controller may also be configured to send an activation signal to the PSUs to activate IStar in each PSU after a fault, which disabled IStar in the power supply system, has been cleared.

However, because only necessary functions are active when the PSU is in active standby OFF mode, the latency to change the mode of the PSU to active ON may take longer than it takes to switch from standby to ON for a PSU not under IStar control. Utilization of one or more embodiments of the present invention described herein reduces latency. Thus, using one or more embodiments of the present invention for a PSU operating under IStar control (or under a different control system) allows for overall reduced power consumption with no loss of (or, in some cases, an increase in) performance of the PSU.

Figure 2:
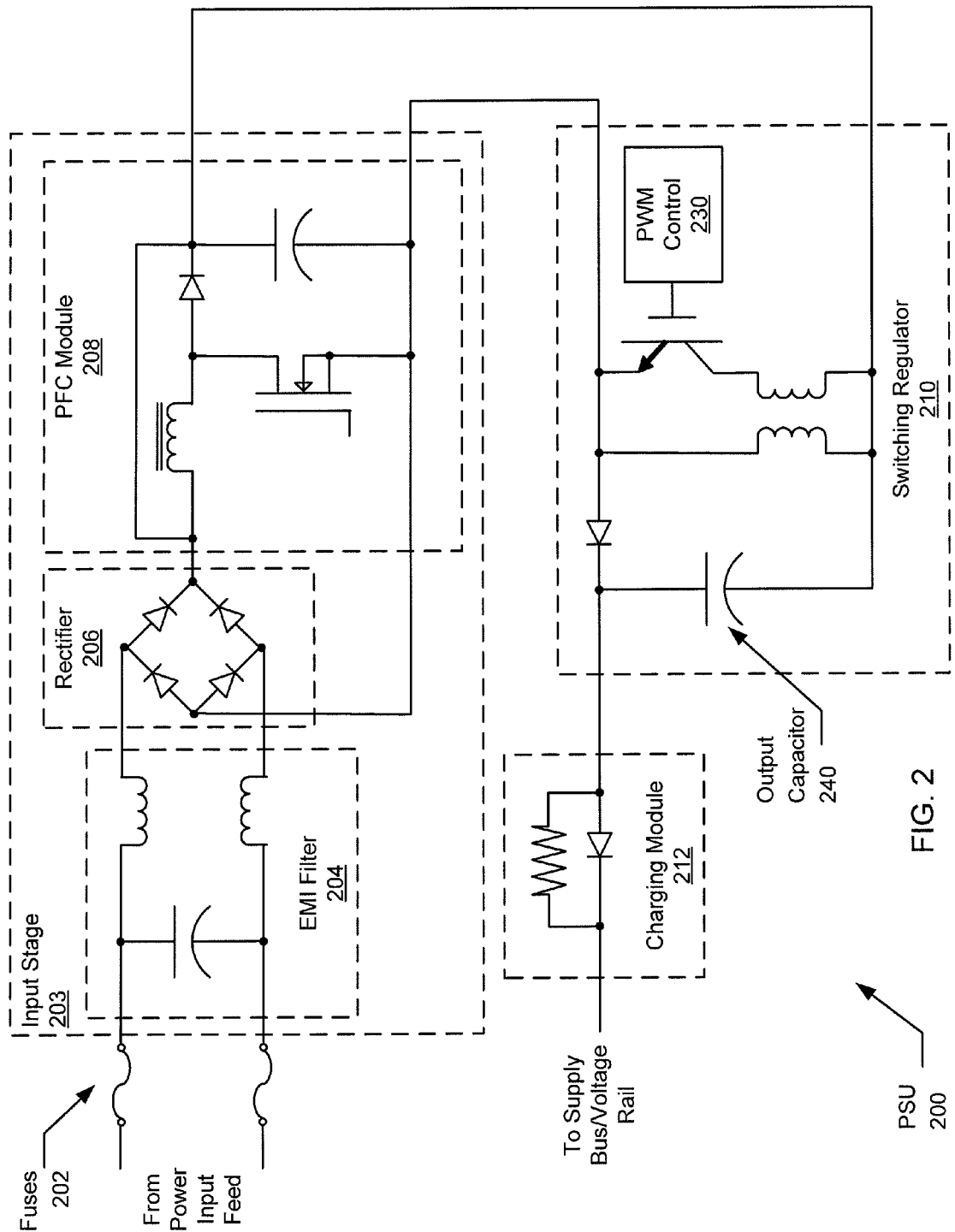
FIG. 2 shows a single line diagram of a PSU in accordance with one or more embodiments of the invention.

FIG. 2 shows a single line diagram of a PSU (200), corresponding to the power supply components described above with respect to FIG. 1, in accordance with one or more embodiments of the invention. The PSU (200) includes one or more fuses (202), an input stage (203), a switching regulator (210), and a charging module (212). The input stage (203) includes an electromagnetic interference (EMI) filter (204), a rectifier (206), and a power factor correction (PFC) module (208). Each of these components is described below. One of ordinary skill in the art will appreciate that embodiments of the invention are not limited to the configuration shown in FIG. 2.

In one or more embodiments of the invention, the fuses (202) are configured to disconnect a PSU from a power input feed. The fuse may be designed to internally destruct when a voltage and/or current that passes through it exceeds a level. When the fuse internally destructs, the circuit from the power input feed to the PSU is opened, which stops the flow of voltage and/or current from the power input feed to the PSU. The fuse may be replaced after it internally destructs. The fuse may be sized (internally destructs for different voltage and/or current levels) according to specifications required by the PSU. In other words, the fuse may be designed to prevent an overvoltage and/or overcurrent from passing through the PSU, potentially destroying other components within the PSU that are not designed to operate at higher voltages and/or currents.

In one or more embodiments of the invention, the input stage (203) is configured to include one or more components of the PSU, where one of the components is the first to receive the input power from the power input feed. The input stage may include components such as, but not limited to, the EMI filter (204), the rectifier (206), and the PFC module (208). The input stage and its associated components may be connected to one end of the fuses (202), where the other end of the fuses is connected to the power input feed. In FIG. 2, the EMI filter is the first component of the input stage to receive input power, followed by the rectifier, and then followed by the PFC module.

In one or more embodiments of the invention, the EMI filter (204) is configured to reduce electromagnetic interference that could affect the electrical circuitry within the PSU. The EMI filter (204) may include a number of different electrical components used in a number of different combinations. For example, an EMI filter may include one or more inductors and one or more capacitors, as shown in FIG. 2. An EMI filter may also include other electrical components, including but not limited to one or more resistors.

In one or more embodiments of the invention, the rectifier (206) is configured to convert AC power to DC power. In such a configuration, the AC power originates from the power input feed, and the supply bus, including the voltage rail, requires DC power. The rectifier may also be replaced by an inverter to convert DC power from the power input feed to AC power supplied to the supply bus. The rectifier may also be replaced by a step-up transformer or a step-down transformer to increase or decrease (respectively) a voltage or current while keeping the power of the same type (i.e., AC or DC) on both sides of the transformer.

In one or more embodiments of the invention, the PFC module (208) is configured to allow full use of the available power received from the power input feed through the rectifier. The PFC module may include a number of different electrical components used in a number of different combinations. For example, a PFC module may include one or more inductors, one or more field-effect transistor, one or more diodes, and one or more capacitors, as shown in FIG. 2. A PFC module may also include other electrical components, including but not limited to one or more resistors and one or more integrated circuits with logic gates and timers.

In one or more embodiments of the invention, the switching regulator (210) is configured to receive continuous power from the PFC module, separate the power into discrete segments of power, and send the discrete segments of power to the supply bus. The switching regulator may include a number of different electrical components used in a number of different combinations. For example, a switching regulator may include one or more inductors, one or more diodes, an electrical switch (e.g., a field-effect transistor (FET)), a switching regulator controller (e.g., a pulse width modulation (PWM) controller (230)), and one or more capacitors, as shown in FIG. 2. A switching regulator may also include other electrical components, including but not limited to one or more resistors and one or more integrated circuits with logic gates and timers. In one or more embodiments, a switching regulator may also act as a rectifier, converter, step-up transformer, or step-down transformer. A capacitor of the switching regulator may be referred to as an output capacitor (240). The output capacitor of the switching regulator may be a single capacitor, multiple capacitors connected in parallel, or multiple capacitors connected in series. The output capacitor may be sized in such a manner to maintain a voltage that is approximately the same as the voltage rail of the supply bus. The output capacitor may be used in conjunction with the charging module, as described below with respect to FIGS. 3A and 3B.

In one or more embodiments of the invention, the charging module (212) is configured to reduce latency when activating a PSU. The charging module may include a resistor, connected to the output capacitor of the switching regulator and the supply bus, placed in parallel with a switch. The switch may be, for example, a diode, a type of FET (e.g., metal-oxide semiconductor FET (MOSFET)), or any other suitable switch. In one or more embodiments of the invention, the value of the resistor is between 1,000 ohms and 10,000 ohms. The resistor may be called a bleed resistor. The resistor may be used to charge the output capacitor of the switching regulator when the PSU is off or in a mode equivalent to off (e.g., active standby OFF). The resistor may be a single resistor, multiple resistors connected in parallel, multiple resistors connected in series, an active charging circuit (e.g., an active current circuit with its power derived), or any other suitable component or device with characteristics similar to a resistor. Two different embodiments of a charging module are described below with respect to FIGS. 3A and 3B.

FIGS. 3A and 3B each show a single line diagram of a charging module, corresponding to the charging module described above with respect to FIG. 2, in accordance with one or more embodiments of the invention. The charging module (300) of FIG. 3A includes a resistor (302), a capacitor (304), an OR diode (306), and, optionally, a ground. The charging module (310) of FIG. 3B includes a resistor (312), a capacitor (314), a FET switch (316), which includes gate driver circuitry (318), and, optionally, a ground (320). Each of these components is described below. One of ordinary skill in the art will appreciate that embodiments of the invention are not limited to the configurations shown in FIGS. 3A and 3B.

Referring to FIG. 3A, charging module A (300) represents one embodiment of the invention. In FIG. 3A, resistor A (302) is connected in parallel with the OR diode (306). In one or more embodiments of the invention, the OR diode allows power to flow from the end connected to capacitor A (304) to the opposite end of the OR diode (connected, for example, to the supply bus), but power does not flow in the opposite direction through the OR diode (e.g., from the supply bus through the OR diode to capacitor A). In one or more embodiments of the invention, capacitor A may be the output capacitor of the switching regulator. Capacitor A may also be connected to ground A (308). Capacitor A may be sized in such a manner to maintain a voltage that is approximately the same voltage of the voltage rail of the supply bus.

Referring to FIG. 3B, charging module B (310) represents one embodiment of the invention. Here, resistor B (312) is connected in parallel with the FET switch (316). In one or more embodiments of the invention, the gate driver circuitry (318) of the FET switch determines how much, if any, power flows from one end of the FET switch to the other end. For example, the gate driver circuitry may allow power to flow from the end of the FET switch connected to capacitor B (314) to the opposite end of the FET switch (connected, for example, to the supply bus). As another example, the gate driver circuitry may not allow power to flow in the opposite direction through the FET switch (e.g., from the supply bus through the FET switch to capacitor B). In one or more embodiments of the invention, capacitor B may be the output capacitor of the switching regulator. Capacitor B may also be connected to ground B (320). Capacitor B may be sized in such a manner to maintain a voltage that is approximately the same voltage of the voltage rail of the supply bus.

Figure 4:
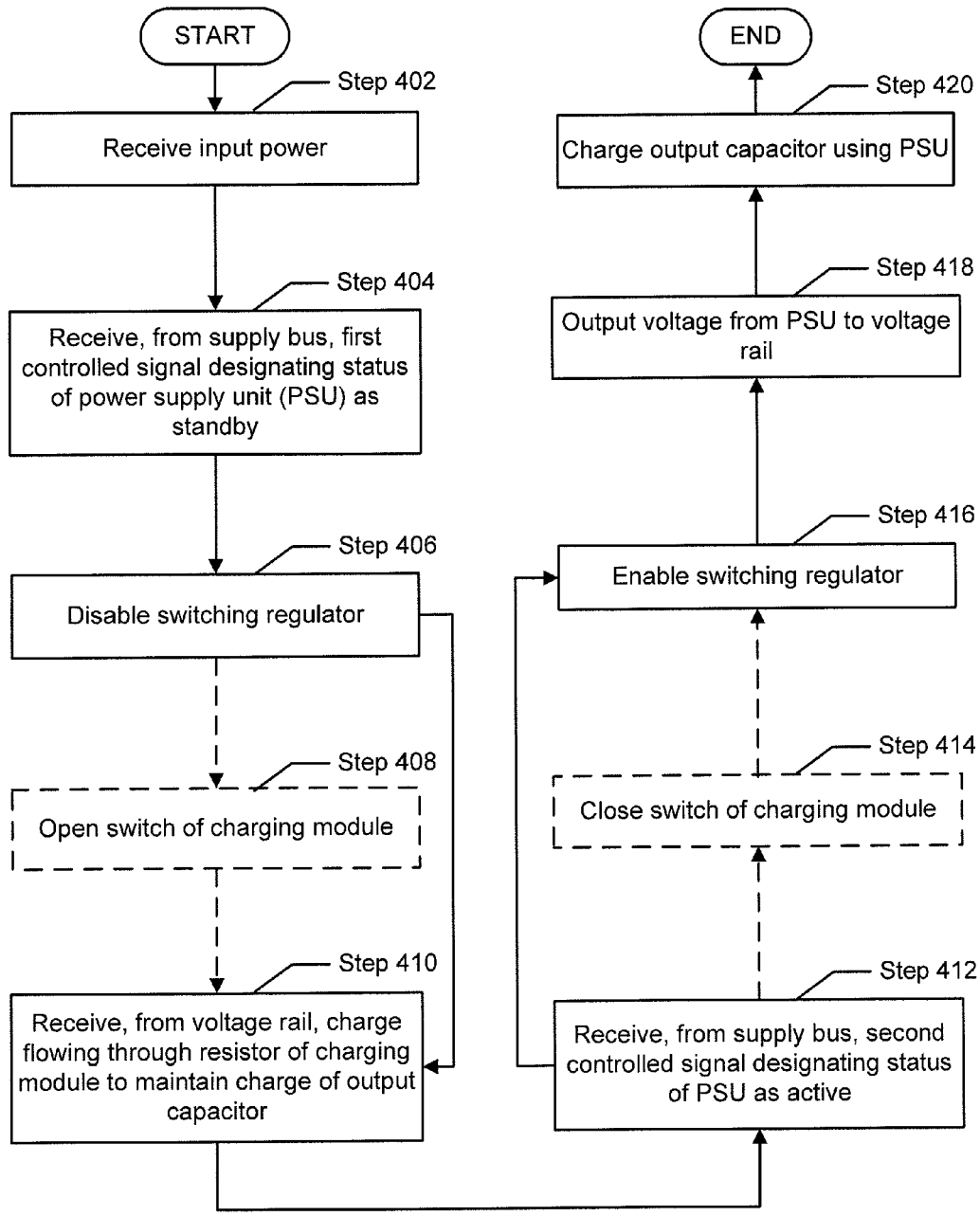
FIG. 4 shows a flowchart of a method in accordance with one or more embodiments of the invention.

FIG. 4 shows a flowchart of a method for reducing latency when activating a PSU in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIG. 4, may be included in performing this method. Accordingly, the specific arrangement of steps shown in FIG. 4 should not be construed as limiting the scope of the invention.

Referring to FIG. 4, in Step 402, input power is received from a power input feed. Input power may also be received from a different source such as, for example, the voltage rail of the supply bus. In one or more embodiments of the invention, the PSU also receives the thresholds and modes from a controller of the power supply system. The thresholds and modes received from the controller may be sent over the supply bus, the voltage rail, or any other medium capable of delivering the thresholds and modes from the controller to the PSU. For example, the PSU may be assigned a standby threshold voltage, below which the PSU is in standby mode. The PSU may also be assigned an active threshold voltage, above which the PSU is on. Further, the PSU may also receive an activation signal, if one is required, to activate a control system for the PSU. For example, a signal activating IStar control may be received.

In Step 404, a first controlled signal is received from the supply bus designating the status of the PSU as standby. The first controlled signal may be sent by a system controller that communicates with all PSUs in the power supply system. The first controlled signal may be less (e.g., by an order of magnitude) than the amount of power measured at the voltage rail. The first controlled signal may be a level of voltage that falls below a threshold voltage required to turn the PSU on.

In Step 406, the switching regulator is disabled. The switching regulator may be disabled in response to the first controlled signal. In one or more embodiments of the invention, when a FET, solid state switch, or other type of switch utilizing gate driver circuitry is used in the charging module, the process proceeds to Step 408, where the switch of the charging module is opened. Then, or in cases where the switch of the charging module is a device that does not utilize gate driver circuitry (e.g., a diode), the process proceeds to Step 410.

In Step 410, a charge, received from the voltage rail, flows through the resistor of the charging module to maintain a charge of the output capacitor of the switching regulator. In one or more embodiments of the invention, the voltage at the output capacitor is slightly lower than the voltage of the voltage rail, for example by an amount equal to an amount of leakage current at the charging module of the PSU times the resistance of the resistor. The output capacitor may be part of the switching regulator. The output capacitor may also be part of the charging module.

In Step 412, a second controlled signal is received is received from the supply bus designating the status of the PSU as active. In one or more embodiments of the invention, the second controlled signal is an aggregation of a bidirectional controlled signal (e.g., voltage) sent by each PSU in the power supply system. Alternatively, the second controlled signal may be sent by a system controller that communicates with all PSUs in the power supply system. The second controlled signal from the supply bus may be less (e.g., by an order of magnitude) than the amount of power measured at the voltage rail. In one or more embodiments of the invention, the second controlled signal is a level of voltage that exceeds a threshold voltage required to turn the PSU on.

Optionally, in Step 414, the switch of the charging module is closed. This Step 414 may be performed under the same conditions that require Step 408 to be performed. In other words, when a FET, solid state switch, or other type of switch utilizing gate driver circuitry is used in the charging module, then that switch of the charging module is closed. In one or more embodiments of the invention, the switch of the charging module is closed in response to enabling the switching regulator. Then, or in cases where the switch of the charging module is a device that does not utilize gate driver circuitry (e.g., a diode), the process proceeds to Step 416.

In Step 416, the switching regulator is enabled. In one or more embodiments of the invention, enabling the switching regulator activates the PSU. In Step 418, the PSU outputs voltage to the voltage rail. In one or more embodiments of the invention, the PSU outputs voltage to the voltage rail in response to enabling the switching regulator. The voltage output by the PSU may flow through the switch of the charging module before reaching the voltage rail. The voltage output to the voltage rail may be at the same (or substantially similar) level of voltage as the level of voltage of the voltage rail.

In Step 420, the output capacitor is charged by the PSU. In other words, the charge of the output capacitor is maintained by the PSU rather than by the voltage rail through the charging module. In one or more embodiments of the invention, the voltage at the output capacitor is slightly higher than the voltage of the voltage rail, for example by an amount equal to an amount of leakage current at the charging module of the PSU times the resistance of the resistor. Because the output capacitor was charged by the charging module prior to Step 414, the latency to activate the PSU may be reduced.

The following describes an example in accordance with one or more embodiments of the invention. The example is for explanatory purposes only and is not intended to limit the scope of the invention. Terminology used in FIGS. 1 through 3B may be used in the example without further reference to FIGS. 1 through 3B.

EXAMPLE

Figure 5A:
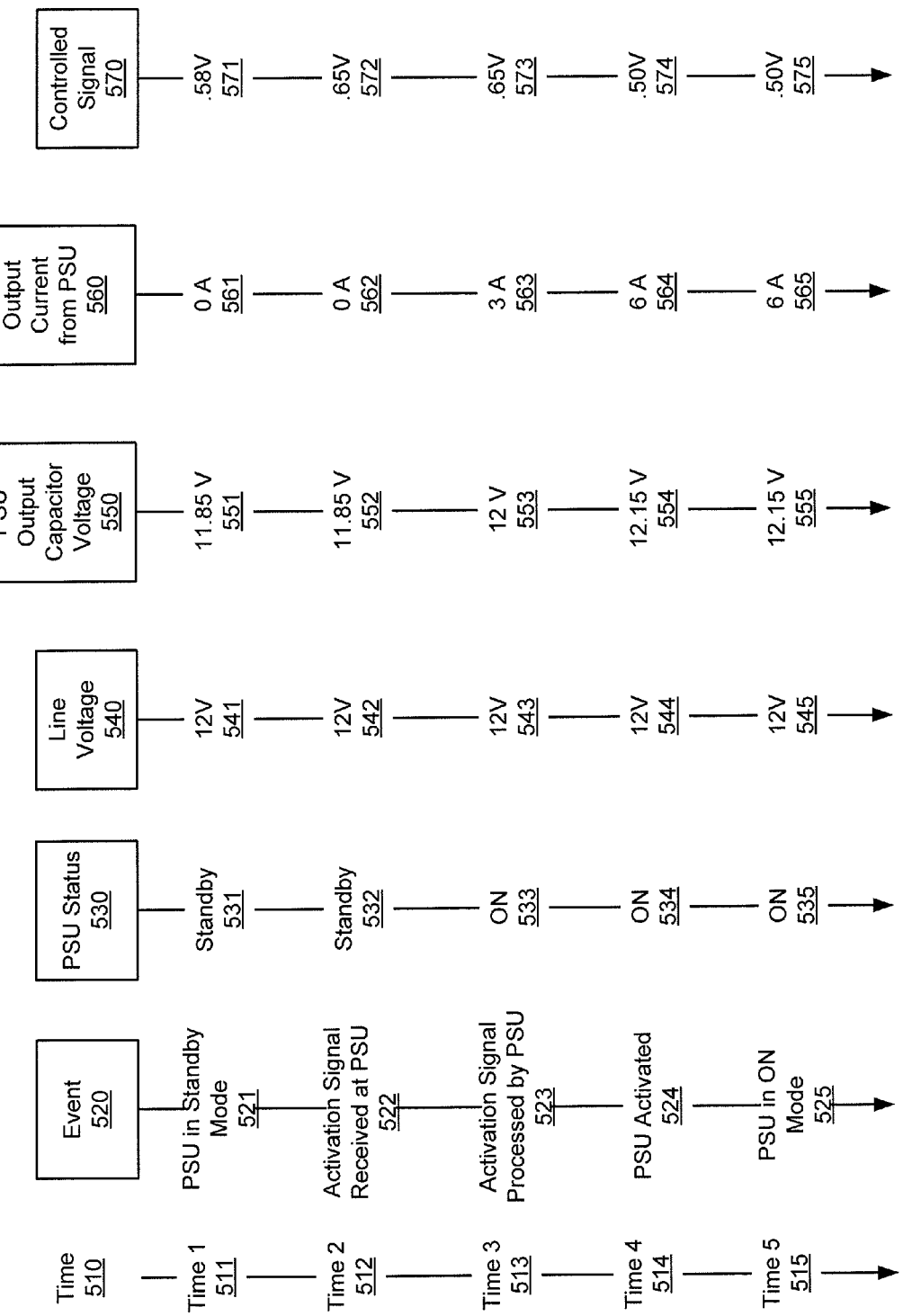
FIG. 5A shows an example of a sequence of events in accordance with one or more embodiments of the invention.
Figure 5B:
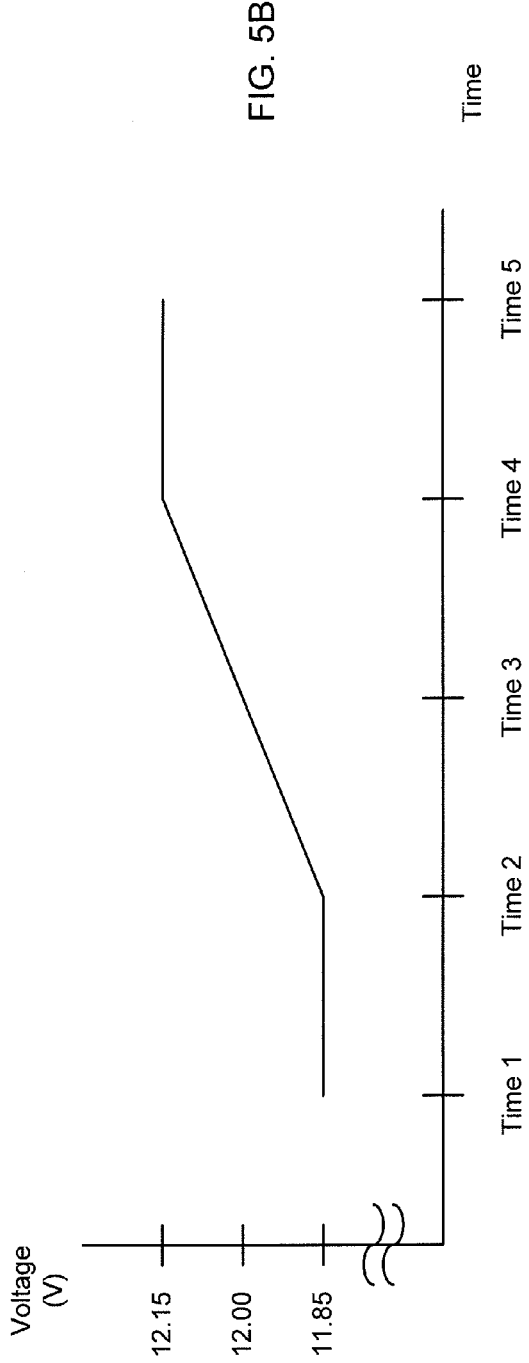
FIGS. 5B and 5C show graphical displays of resulting operating conditions from the example shown in FIG. 5A in accordance with one or more embodiments of the invention.
Figure 5C:
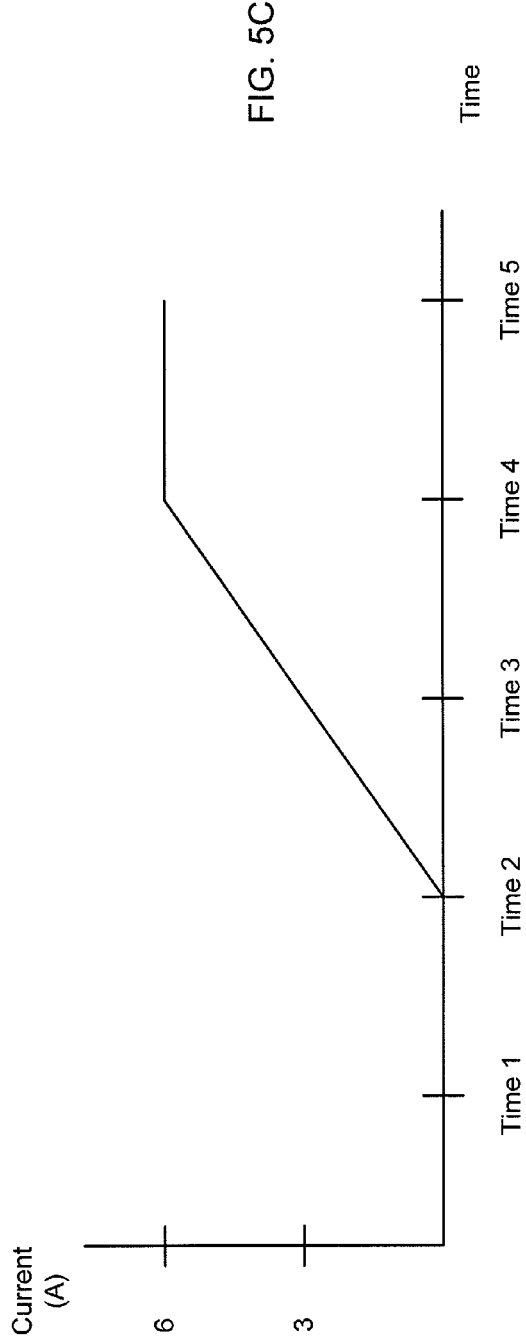

Consider the following example, as illustrated in FIGS. 5A-5C, which describes reducing latency when activating a PSU in accordance with one or more embodiments described above. The example shows a timeline (510) with a series of times. For each time in the series of times, there is an event (520) that occurs. Further, for each time in the series of times, an indication is given for the PSU status (530), the rail voltage (540), the PSU output capacitor voltage (550), the output current from the PSU (560), and the level of the controlled signal (570) from the supply bus. Both the PSU output capacitor voltage (550) and the output current from the PSU (560) are shown graphically over time in FIGS. 5B and 5C, respectively.

This example assumes that the PSU initialized so that the thresholds and modes have already been assigned to the PSU. In this case, the control system and each of the PSUs utilize IStar. For the PSU in this example, the threshold voltage for active standby OFF is 0.6V, and the threshold voltage for active ON is 0.62V. This example also assumes that at least one other PSU in the power supply system has a status of ON (or active ON when operating in IStar). As a result, the rail voltage is at 12V at the start of the example. In one or more embodiments of the invention, when the PSU is operating under IStar control, the PSU status (530) in standby (e.g., 531) is active standby OFF mode. Likewise, the PSU status (530) in ON (e.g., 533) is active ON mode.

Initially, at time 1 (511) of the timeline (510), the event (520) is that the PSU is in standby mode (521), which puts the PSU status (530) in standby (531). This event (520) is driven by the controlled signal (570) from the supply bus of 0.58V (571). Because the threshold to change the mode to active ON (0.62V) is higher than the controlled signal (0.58V), the mode of the PSU remains in standby (active standby OFF when using IStar). The voltage of the rail voltage (540) is 12V (541). The PSU output capacitor voltage (550) is 11.85V, and the output current from the PSU (508) is zero. In one or more embodiments of the invention, the PSU output capacitor voltage is slightly less than 12V (i.e., the rail voltage) because of leakage current at the PSU output node and the resistor of the charging module.

Next, at time 2 (512), the event (510) is that an activation signal is received at the PSU (522), which is driven by an increase in the controlled signal (570) from the supply bus. In this example, the controlled signal has increased to 0.65V (572). The PSU status (530) remains in standby (532) because there is latency from receiving the controlled signal to change the status of the PSU and actually implementing the change in status of the PSU. The rail voltage (540) remains at 12V (542). Further, the PSU output capacitor voltage (550) remains at 11.85V, and the output current from the PSU (560) remains at zero.

At time 3 (513), the event (510) is that the activation signal is processed by the PSU (523). The controlled signal (570) from the supply bus remains at 0.65V (573), and the rail voltage (540) remains at 12V (543). However, the PSU status (530) changes from standby to ON (533) (or active ON when operating under IStar). Also, the PSU output capacitor voltage (550) begins ramping up from 11.85V to 12V (553). Likewise, the output current from the PSU (508) increases from zero to 3 A (563).

At time 4 (514), the event (510) is that the PSU is activated (524). The controlled signal (570) from the supply bus is reduced to 0.5V (574), which accounts for the PSU's activation in the power supply system. The controlled signal (570) is reduced from 0.65V to 0.5V because the controlled signal may reflect an average of the signals contributed by the current shared PSUs in the power supply system. Alternatively, the controlled signal (570) may show an increase (for example, from 0.65V to 0.68V) if the controlled signal reflects a sum or aggregate of the signals contributed by the current shared PSUs in the power supply system. In this example, a controlled signal (570) of 0.5V is less than the threshold for the IStar mode of Active ON and above the threshold for the IStar mode of Active standby OFF for the PSU. However, because the PSU is already in the IStar mode of Active ON, the PSU remains in the IStar mode of Active ON, even though the level of the controlled signal is below the threshold for the IStar mode of Active ON, because IStar is still active (e.g., the mode of the PSU is not changed to ON) and the controlled signal has not fallen below the threshold for the IStar mode of Active standby OFF for the PSU.

Continuing with time 4 (514), the rail voltage (540) remains at 12V (544), which is the power output by the PSU to the voltage rail of the supply bus. The PSU status (530) remains ON (534) (or active ON when operating under IStar). Also, the PSU output capacitor voltage (550) continues to ramp up to 12.15V (554). Likewise, the output current from the PSU (508) finishes increasing to 6 A (564). As shown in FIG. 5B, the latency from time 2 (512) to time 4 (514) is under two milliseconds.

At time 5 (515), the event (510) is that the PSU remains in a steady state ON mode (525). The controlled signal (570) from the supply bus remains at 0.5V (575), which may mean that no other PSUs in standby mode have been called upon to become active, and that no PSUs that have been ON have been turned off or tripped (i.e., faulted). The rail voltage (540) remains at 12V (545). The PSU status (530) remains ON (535) (or active ON when operating under IStar). Also, the PSU output capacitor voltage (550) remains at 12.15V (555). Likewise, the output current from the PSU (508) remains at 6 A (565).

FIG. 5B graphically displays the PSU output capacitor voltage (550) described above with respect to FIG. 5A. Further, FIG. 5C graphically displays the output current from the PSU (560) described above with respect to FIG. 5A. The time scale in FIGS. 5B and 5C may not be to scale. The span of time between Time 2 and Time 4 in FIGS. 5B and 5C is approximately two milliseconds.

One or more embodiments of the invention reduce latency. When a PSU receives an instruction to change its status from standby to active/ON, embodiments of the invention reduce the latency during which the transition takes place. Reducing latency in changing modes for the PSU may, at least, increase reliability of the PSU and/or the power supply system. Specifically, by using one or more embodiments of the charging module, the latency, when changing the mode of a PSU from standby to on, may be two milliseconds or less.

Moreover, when the PSU is controlled by IStar, the standby mode is active standby OFF, which requires less power because unnecessary functions are quiesced. Use of embodiments of a charging module in a PSU under IStar control show both a reduction in energy consumption and an increase in power system performance by reducing latency.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reducing latency using a charging module when activating a power supply unit (PSU) among a plurality of PSUs in a power supply system, the method comprising:
 receiving, by the PSU from a power input feed, input power;
 receiving, from a supply bus shared by the plurality of PSUs, a first controlled signal designating a status of the PSU as standby;
 disabling, in response to the first controlled signal, a switching regulator of the PSU, wherein the switching regulator is configured to:
  receive continuous power from a power factor correction module,
  separate the continuous power into a plurality of discrete segments of power, and
  send the plurality of discrete segments of power to the supply bus;
 receiving, from a voltage rail of the supply bus, charge flowing through a resistor of the charging module to maintain a charge of an output capacitor of the switching regulator;
 receiving, from the supply bus, a second controlled signal designating the status of the PSU as active;

enabling, in response to the second controlled signal, the switching regulator;

in response to enabling the switching regulator:
outputting a voltage from the PSU through the charging module to the voltage rail; and
charging the output capacitor using the PSU.

2. The method of claim 1, wherein the charging module comprises a switch connected in parallel with the resistor between the voltage rail and the output capacitor.

3. The method of claim 2, wherein the switch is a diode configured to prevent a flow of energy from the voltage rail to the output capacitor.

4. The method of claim 1, wherein a resistance of the resistor is between 1,000 ohms and 10,000 ohms.

5. The method of claim 1, wherein the latency from the status of the PSU as standby to the PSU outputting the voltage to the voltage rail is less than 2 milliseconds.

6. The method of claim 2, further comprising:
opening, in response to disabling the switching regulator, the switch of the charging module; and
closing, in response to receiving the second controlled signal, the switch of the charging module.

7. The method of claim 6, wherein the switch is a field-effect transistor.

8. The method of claim 1, wherein the PSU is controlled by a control system for a power supply system to manage the PSUs in a manner that increases energy efficiency, the management being delegated to each PSU of the plurality of PSUs in the power supply system to allow each PSU to autonomously control its operation once initial thresholds and settings are received from the control system.

9. The method of claim 8, wherein active standby OFF is the status when the PSU is in standby.

10. The method of claim 8, wherein active ON is the status when the PSU is active.

11. A system for reducing latency when activating a power supply unit (PSU) among a plurality of PSUs in a power supply system, the system comprising:
a supply bus comprising a voltage rail, the supply bus and voltage rail operatively connected to each PSU within the power supply system;
a plurality of power input feeds, wherein each of the plurality of power input feeds provides input voltage to one of the plurality of PSUs; and
the plurality of PSUs, wherein each of the plurality of PSUs comprises:
memory for storing instructions executed by a central processing unit (CPU),
a charging module comprising a resistor and a switch, and
a switching regulator comprising an output capacitor, wherein the switching regulator is configured to:
receive continuous power from a power factor correction module,
separate the continuous power into a plurality of discrete segments of power, and
send the plurality of discrete segments of power to the supply bus,
wherein the PSU is configured to:
receive input power from one of the plurality of power input feeds;
receive, from the supply bus, a first controlled signal designating the status of the PSU as standby;
disable, using the CPU and in response to the first controlled signal, the switching regulator;
receive, from the voltage rail, charge flowing through the resistor of the charging module to maintain a charge of the output capacitor of the switching regulator;
receive, from the supply bus, a second controlled signal designating the status of the PSU as active;
enable, using the CPU and in response to the second controlled signal, the switching regulator;
charge the output capacitor using the PSU; and
output voltage from the PSU through the charging module to the voltage rail.

12. The system of claim 11, wherein a resistance of the resistor is between 1,000 ohms and 10,000 ohms.

13. The system of claim 11, wherein the switch is connected in parallel with the resistor between the voltage rail and the output capacitor.

14. The system of claim 13, wherein the switch is a diode configured to prevent a flow of energy from the voltage rail to the output capacitor.

15. The system of claim 13, wherein the PSU is further configured to:
open, in response to disabling the switching regulator, the switch of the charging module; and
close, in response to enabling the switching regulator, the switch of the charging module.

16. The system of claim 15, wherein the switch is a field-effect transistor.

17. A power supply unit (PSU) comprising:
a charging module comprising a resistor and a switch and operatively connected to a supply bus;
a switching regulator comprising an output capacitor and operatively connected to the charging module, wherein the switching regulator is configured to:
receive continuous power from a power factor correction module,
separate the continuous power into a plurality of discrete segments of power, and
send the plurality of discrete segments of power to the supply bus;
an input stage comprising a plurality of components configured to:
receive input power from a power input feed;
receive, from the supply bus through the resistor of the charging module, a first controlled signal designating a status of the PSU as standby;
disable, in response to the first controlled signal, the switching regulator;
receive, from a voltage rail of the supply bus, charge flowing through the resistor of the charging module to maintain a charge of the output capacitor;
receive, from the supply bus, a second controlled signal designating the status of the PSU as active;
enable, in response to the second controlled signal, the switching regulator;
in response to enabling the switching regulator:
output a voltage from the input stage through the switch of the charging module to the voltage rail; and
charge the output capacitor using the voltage output from the input stage.

18. The PSU of claim 17, wherein the plurality of components of the input stage comprise an electromagnetic interference filter, a rectifier, and a power factor correction module.

19. The PSU of claim 17, wherein the switch and the resistor of the charging module are connected in parallel, wherein the switch is open for charge flowing from the supply bus to the switching regulator, and wherein the switch is closed for charge flowing from the switching regulator to the supply bus.

20. The PSU of claim 17, wherein the output capacitor is sized to maintain a voltage that is substantially the same as a voltage of the voltage rail of the supply bus.

* * * * *